Jan. 19, 1926.  
W. C. BRUHN ET AL  
1,570,125  
DUMPING WAGON BOX  
Filed Feb. 7, 1924  
2 Sheets-Sheet 1
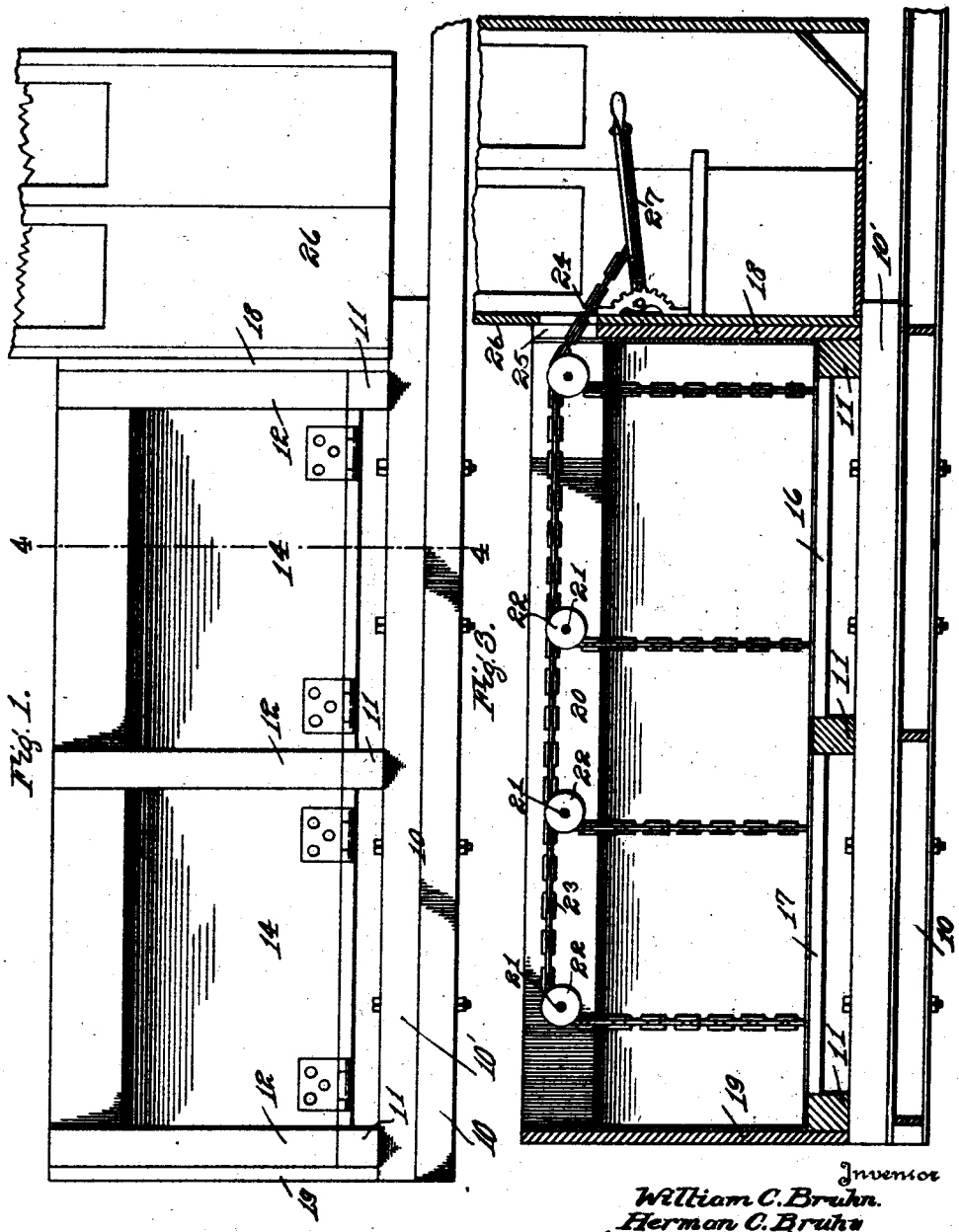
Inventor  
William C. Bruhn.  
Herman C. Bruhn  
By  
Attorney Jan. 19, 1926.  
W. C. BRUHN ET AL  
DUMPING WAGON BOX  
Filed Feb. 7, 1924  
1,570,125  
2 Sheets—Sheet 2
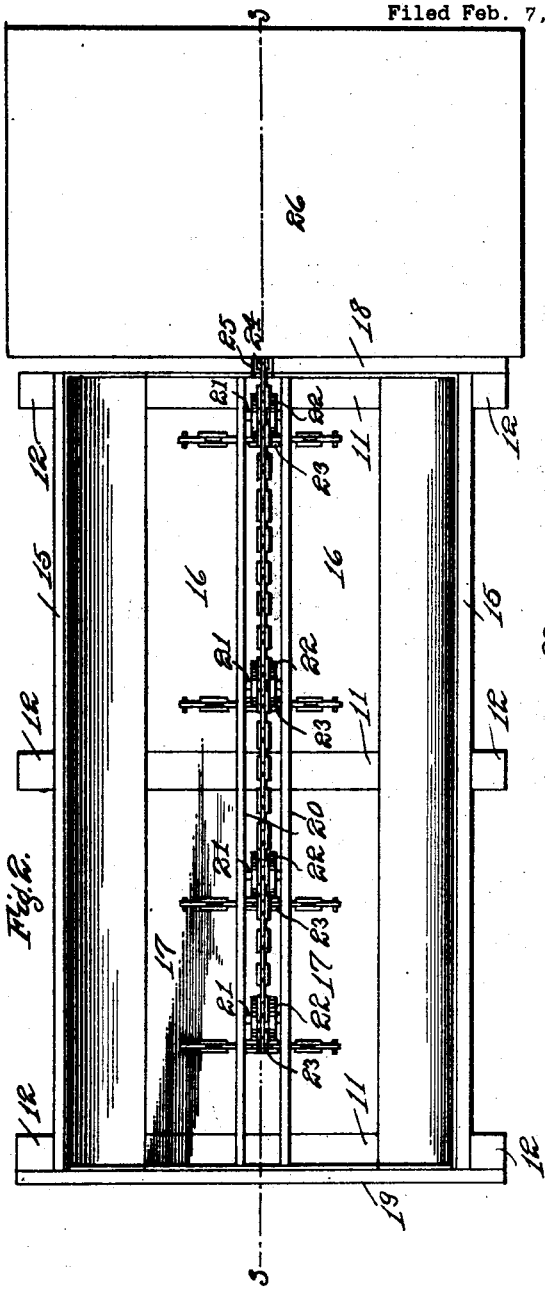
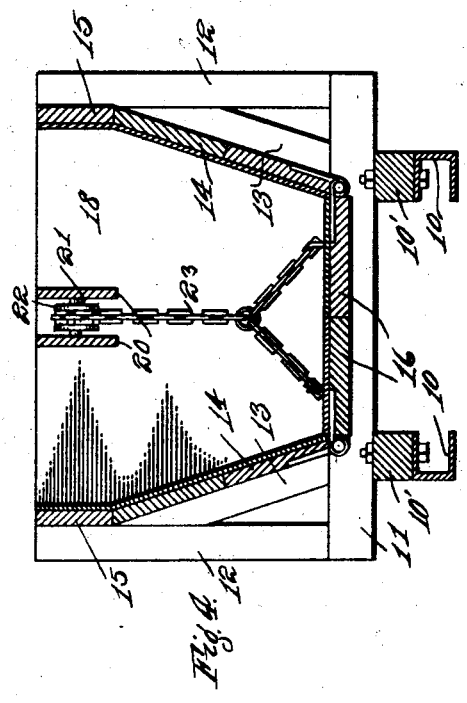
Inventors  
William C. Bruhn.  
Herman C. Bruhn.  
Attorney Patented Jan. 19, 1926.

1,570,125

UNITED STATES PATENT OFFICE.

WILLIAM C. BRUHN AND HERMAN C. BRUHN, OF SPIRIT LAKE, IOWA.

DUMPING-WAGON BOX.

Application filed February 7, 1924. Serial No. 691,304.

*To all whom it may concern:*

Be it known that we, WILLIAM C. BRUHN and HERMAN C. BRUHN, citizens of the United States, residing at Spirit Lake, in the county of Dickinson, State of Iowa, have invented certain new and useful Improvements in Dumping-Wagon Boxes; and we do hereby declare the following to be a full, clear, and exact description of the invention, such as will enable others skilled in the art to which it appertains to make and use the same.

This invention relates to new and useful improvements in wagons, and particularly to dumping wagons.

One object is to provide a box for the chassis of an automobile truck, having a dumping bottom, and which will successfully operate to dump a load without interference by the members of the chassis.

Another object is to provide a construction of this character which may be conveniently operated from the driver's seat.

Other objects and advantages will be apparent from the following description when taken in connection with the accompanying drawings.

In the drawings:

Figure 1 is a side elevation of a wagon made in accordance with the present invention, the wheels and running gear being omitted.

Figure 2 is a top plan view of the same.

Figure 3 is a vertical longitudinal central sectional view on the line 3—3 of Figure 2.

Figure 4 is a vertical transverse sectional view on the line 4—4 of Figure 1.

Referring particularly to the accompanying drawings, 10 represents the longitudinal side bars of the chassis of an automobile truck, on which are secured the longitudinal sills 10′. Transverse sills 11 are secured on the sills 10′, and on each end of each sill 11 there is secured an upwardly extending standard 12, braced by means of the brace bars 13, said brace bars extending from the standard to the sill, and inwardly of the standard. Secured to the upper faces of the brace bars 13, and extending longitudinally of the chassis, are the side boards 14, of the wagon box, the said upper faces of the said side boards lying in the plane of the upper ends of the braces. Secured to the inner vertical faces of the portions of standards, above the upper ends of the braces, and having their upper edges lying in the plane of the upper ends of the standards, and with their lower edges resting on the upper edges of the side boards 14, are the narrower boards, 15, the same being of the same length as that of the side boards, and constituting portions of said side boards of the box.

The lower edges of the side boards 14, which, as will be readily seen from an inspection of the sectional view Figure 4, are inclined downwardly and inwardly, are spaced apart a distance slightly less than the distance between the side bars of the chassis, and hinged to the said lower edges are the sets of dumping bottom doors 16 and 17, the former being disposed between the front and intermediate sills 11, while the latter are disposed between the intermediate and rear sills 11. These doors, when closed, form a horizontal bottom for the wagon box. Head and tail boards 18 and 19, respectively, are secured to the front standards and sill, and to the rear standards and sill, to form the front and rear ends of the box.

Secured to the upper portions of the head and tail boards, and extending longitudinally over the center of the box, are the parallel rails 20, and disposed between these rails and mounted on the transverse shafts 21, which are supported in said sills, are the grooved wheels or pulleys 22. Passing over these pulleys are the chains 23, which have their lower ends connected respectively to the said doors 16 and 17. These chains are connected to a single chain 24 which extends through an opening 25, formed in the upper central portion of the head board of the box, and is connected to a pivotally mounted lever located in the cab 26, of the truck, as shown at 27, said lever being within convenient reach of the driver for opening and closing the doors 16 and 17, for the purpose of dumping and retaining a load.

From the foregoing it will be seen that there is provided a dumping wagon box, especially adapted for the chassis of an automobile truck, which can be easily operated by the driver, from his seat, and also that the bottom doors may be opened and closed without interference by the parts of the chassis.

What is claimed is:

The combination with the chassis of a motor vehicle having longitudinal bars, of longitudinal bars secured to and extending longitudinally on the chassis bars, transverse sills secured on the second-named longitudinal bars, a receptacle erected on the sills, said receptacle including sides having upper vertical portions and lower downwardly and inwardly inclined portions, the lower edges of the lower portions resting on the cross sills above and parallel with the longitudinal bars, uprights carried by the outer ends of the sills and connected with the vertical portions of the sides of the receptacle, and doors hinged to the lower edges of the inclined portions of the sides of the receptacle between the transverse sills and arranged to swing downwardly between the longitudinal bars and the chassis bars and said transverse sills.

In testimony whereof, we affix our signatures.

WILLIAM C. BRUHN.
HERMAN C. BRUHN.